(12) United States Patent
Takemura et al.

(10) Patent No.: US 9,075,254 B2
(45) Date of Patent: Jul. 7, 2015

(54) OPTICAL WAVEGUIDE DEVICE MODULE

(75) Inventors: Motohiro Takemura, Chiyoda-ku (JP);
Shinsuke Kanno, Chiyoda-ku (JP)

(73) Assignee: Sumitomo Osaka Cement Co., Ltd.,
Chiyoda-ku, Tokyo (JP)

( * ) Notice: Subject to any disclaimer, the term of this patent is extended or adjusted under 35 U.S.C. 154(b) by 699 days.

(21) Appl. No.: 13/065,671

(22) Filed: Mar. 28, 2011

(65) Prior Publication Data

US 2011/0268382 A1     Nov. 3, 2011

(30) Foreign Application Priority Data

Mar. 29, 2010   (JP) ................................. 2010-076053

(51) Int. Cl.
*G02F 1/035*   (2006.01)
*G02F 1/03*    (2006.01)

(52) U.S. Cl.
CPC ............ *G02F 1/0316* (2013.01); *G02F 1/0356* (2013.01); *G02F 1/035* (2013.01)

(58) Field of Classification Search
CPC .................................................. G02F 1/0356
See application file for complete search history.

(56) References Cited

U.S. PATENT DOCUMENTS

| 6,741,379 B2 * | 5/2004 | Kaitoh et al. ................. 359/279 |
| 2007/0246250 A1 | 10/2007 | Tomita et al. |
| 2008/0193074 A1 * | 8/2008 | Sugiyama ........................ 385/8 |

FOREIGN PATENT DOCUMENTS

| CN | 1417620 A | 5/2003 |
| EP | 1 335 237 A1 | 8/2003 |
| JP | 2003-233043 A | 8/2003 |
| WO | WO2006028098 A1 | 3/2006 |

* cited by examiner

*Primary Examiner* — Uyen Chau N Le
*Assistant Examiner* — Chad Smith
(74) *Attorney, Agent, or Firm* — Taft Stettinius & Hollister LLP

(57) ABSTRACT

An optical waveguide device module is provided, wherein a control electrode includes a signal electrode and ground electrodes disposed to sandwich the signal electrode, a connection substrate is provided with a signal line and ground lines disposed to sandwich the signal line, the distance W1 between the ground electrodes in the input end or the output end of the control electrode is larger than the distance W2 between the ground lines on the optical waveguide device side of the connection substrate, the control electrode has a portion of which the distance between the ground electrodes is smaller than the distance W2 in a portion away from the input end or the output end thereof, and interconnections of which the distance W between ground interconnections connecting the optical waveguide device and the connection substrate is at least smaller than the distance W1.

11 Claims, 5 Drawing Sheets

OPTICAL WAVEGUIDE DEVICE MODULE

BACKGROUND OF THE INVENTION

Priority is claimed to Japan Pat. App. Ser. No. 2010-076053, filed Mar. 29, 2010, hereby incorporated by reference in its entirety.

FIELD OF THE INVENTION

The present invention relates to an optical waveguide device module, and specifically to an optical waveguide device module in which an optical waveguide device and a connection substrate are accommodated within a casing.

DESCRIPTION OF RELATED ART

In the optical measurement technical field or the optical communication technical field, optical waveguide devices are widely used in which an optical waveguide is formed in a substrate, having an electro-optic effect, such as an optical modulator or an optical switch. Usually, these optical waveguide devices are accommodated within an airtight casing, and form an optical waveguide device module.

As disclosed in Japanese Unexamined Patent Application Publication No. 2003-233043, a relay substrate for electrically connecting an input line from the outside to a control electrode of the optical waveguide device, or a termination substrate, electrically connected to the output side of the control electrode of the optical waveguide device, for absorbing an output signal or leading out to the outside of the module is accommodated within a casing of the optical waveguide device module.

Usually, in order to improve the frequency characteristic by reducing discontinuity of the connection portions, as shown in FIG. 1, the electrode sizes or the distances between ground electrodes (GND) of a modulation substrate and a relay substrate which are included in the optical waveguide device are designed so as to be equal to each other. In addition, the same is true of the connection of the termination substrate and the modulation substrate. In this manner, when the sizes or the distances of the electrodes of the modulation substrate and the connection substrate are matched to each other, it is required to prepare the connection substrate only for kinds of optical waveguide devices, which results in an increase in the manufacturing cost.

Progress is being made in terms of achieving a higher frequency (wider bandwidth) in the optical waveguide devices, and materials, which have a lower dielectric constant than that of a substrate (modulation substrate), such as alumina, included in the optical waveguide device, have come to be used in the relay substrate shown in FIGS. 2A and 2B. In addition, since the frequency characteristic is prevented from being deteriorated by a substrate mode and the like, the sizes of the connection portions such as the relay substrate also become small. For this reason, as in the related art, when the distances of GNDs are made equal to each other, the width of a signal electrode of the optical waveguide device becomes small. Therefore, since the widths of the signal lines of a substrate or a semiconductor substrate, such as $LiNbO_3$, having an electro-optic effect and the relay substrate are different from each other, discontinuity of the connection portions occurs and thus the electrical characteristics are caused to be deteriorated. In addition, when the width of the signal lines or the distance of the ground (GND) lines are rapidly changed between the input side and the output side of the relay substrate, impedance mismatching easily occurs, and the deterioration of the electrical characteristics becomes even more remarkable.

Further, in order to match the input line from the outside and impedance of the relay substrate and the optical waveguide device, as shown in FIG. 2B (corresponding to an enlarged view of the portion of sign X in FIG. 2A), when the width of the signal electrode S1 of the optical waveguide device and the width of the signal line S2 of the relay substrate are made different from each other, and the distance W1 between the ground electrodes of the optical waveguide device and the distance W2 between the ground lines of the relay substrate are made different from each other, the electric field intensities of the signal portion and the ground portion are different from each other in the relay substrate and the optical waveguide device, discontinuity in the electrical connection occurs, and deterioration of the electrical characteristics results. Meanwhile, reference numerals 1 and 2 denote interconnections that electrically connect the optical waveguide device and the relay substrate.

SUMMARY OF THE INVENTION

The invention is to solve the above-mentioned problems, and to provide an optical waveguide device module in which discontinuity in the electrical connection of the optical waveguide device and the connection substrate (relay substrate or termination substrate) is reduced and deterioration of the electrical characteristics is prevented. Furthermore, it is to provide an optical waveguide device module capable of using a common connection substrate with respect to a different type of optical waveguide device and lowering the manufacturing costs.

In order to solve the above-mentioned problem, there is provided an optical waveguide device module including: an optical waveguide device including a substrate having an electro-optic effect, an optical waveguide formed in the substrate, and a control electrode for controlling light waves propagated through the optical waveguide; a connection substrate including an interconnection, provided to the outside of the optical waveguide device, which is electrically connected to the control electrode; and a casing that accommodates the optical waveguide device and the connection substrate therein, wherein the control electrode includes a signal electrode and ground electrodes disposed so as to sandwich the signal electrode, the connection substrate is provided with a signal line and ground lines disposed so as to sandwich the signal line, the distance W1 between the ground electrodes in the input end or the output end of the control electrode is larger than the distance W2 between the ground lines on the optical waveguide device side of the connection substrate, the control electrode has a portion of which the distance between the ground electrodes is smaller than the distance. W2 in a portion away from the input end or the output end thereof, and the optical waveguide device module includes interconnections of which the distance W between ground interconnections that connect the optical waveguide device and the connection substrate is at least smaller than the distance W1.

In the above-mentioned optical waveguide device module, a connection position of the end on the optical waveguide device side of the ground interconnection is connected to a portion smaller than the distance W2.

In the above-mentioned optical waveguide device module, the optical waveguide device module includes other interconnections, which are disposed so as to sandwich the ground interconnection that connects the optical waveguide device and the connection substrate, and of which the interconnection distance is larger than the distance W1.

In the above-mentioned optical waveguide device module, the width of the signal electrode in the input end or the output end and the width of the signal line on the optical waveguide device side are different from each other in size.

In the above-mentioned optical waveguide device module, the dielectric constant of the connection substrate is lower than the dielectric constant of the substrate included in the optical waveguide device.

In the above-mentioned optical waveguide device module, the interconnection that connects the optical waveguide device and the connection substrate is formed by wire bonding.

According to the above-mentioned configuration, the distance W1 between the ground electrodes in the input end or the output end of the control electrode of the optical waveguide device is larger than the distance W2 between the ground lines on the optical waveguide device side of the connection substrate, the control electrode has a portion of which the distance between the ground electrodes is smaller than the distance W2 in a portion away from the input end or the output end thereof, and the optical waveguide device module includes at least interconnections of which the distance W between ground interconnections that connect the optical waveguide device and the connection substrate is smaller than the distance W1. Thereby, it is possible to restrict the electric field intensities of the signal portion and the ground portion from differing between the connection substrate and the optical waveguide device, to reduce the electrically, discontinuous portions in the connection portions of the two, and to prevent the electrical characteristics such as a high frequency characteristic from being deteriorated. Furthermore, even with respect to an optical waveguide device having electrodes with different sizes or distances, it is possible to proceed appropriately by using a common connection substrate, thereby allowing the manufacturing costs to be lowered.

According to the above-mentioned configuration, since a connection position of the end on the optical waveguide device side of the ground interconnection is connected to a portion smaller than the distance W2, it is possible to more continuously change the electric field intensity from the connection substrate side to the optical waveguide device side, thereby allowing deterioration of the electrical characteristics to be suppressed.

According to the above-mentioned configuration, since the optical waveguide device module includes other interconnections, which are disposed so as to sandwich the ground interconnection that connects the optical waveguide device and the connection substrate, and of which the interconnection distance is larger than the distance W1, it is possible to more reliably perform the electrical connection of the ground portions.

According to the above-mentioned configuration, the width of the signal electrode in the input end or the output end of the control electrode and the width of the signal line on the optical waveguide device side are different from each other in size. Therefore, electrical discontinuity due to the connection portions usually occurs, but the distance W between the ground interconnections that connect the optical waveguide device and the connection substrate is set to be smaller than the distance W1, whereby it is possible to suppress discontinuity of the electrical strength, and to prevent the electrical characteristics from being deteriorated.

According to the above-mentioned configuration, the dielectric constant of the connection substrate is lower than the dielectric constant of the substrate included in the optical waveguide device. Therefore, when impedance matching is performed, the width of the signal electrode or the distance between the ground electrodes in the connection portions is usually set to values different from those of the signal line or the ground line of the connection substrate, but in the invention, discontinuity in the connection portions can be suppressed.

According to the above-mentioned configuration, since the interconnection that connects the optical waveguide device and the connection substrate is formed by wire bonding, the distance W between the ground interconnections can be easily set to be smaller than the distance W1.

DETAILED DESCRIPTION OF THE INVENTION

Figure 3:
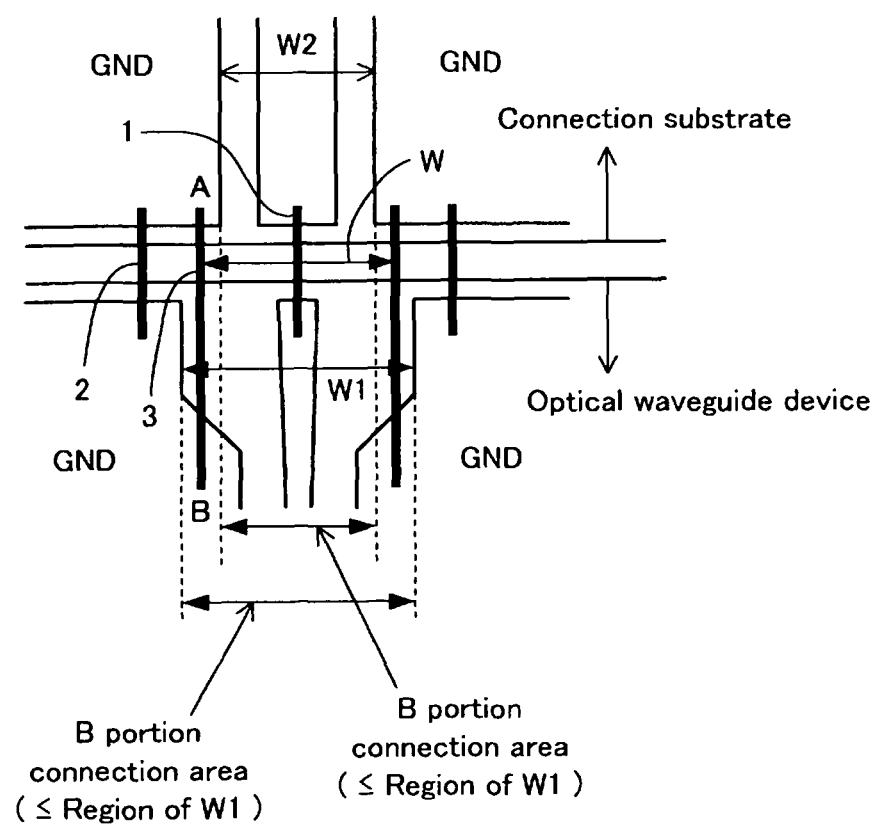
FIG. 3 is a diagram for explaining an interconnection state between an optical waveguide device and a connection substrate used in an optical waveguide device module according to the invention.

Hereinafter, an optical waveguide device module according to the invention will be described in detail using a preferred example. As shown in FIG. 3, the optical waveguide device module according to the invention includes: an optical waveguide device including a substrate having an electro-optic effect, an optical waveguide formed in the substrate, and a control electrode for controlling light waves propagated through the optical waveguide; a connection substrate including an interconnection, provided to the outside of the optical waveguide device, which is electrically connected to the control electrode; and a casing that accommodates the optical waveguide device and the connection substrate therein, wherein the control electrode includes a signal electrode and ground electrodes disposed so as to sandwich the signal electrode, the connection substrate is provided with a signal line and ground lines disposed so as to sandwich the signal line, the distance W1 between the ground electrodes in the input end or the output end of the control electrode is larger than the distance W2 between the ground lines on the optical waveguide device side of the connection substrate, the control electrode has a portion of which the distance between the ground electrodes is smaller than the distance W2 in a portion away from the input end or the output end thereof, and the optical waveguide device module includes interconnections of which the distance W between ground interconnections 3 that connect the optical waveguide device and the connection substrate is at least smaller than the distance W1.

As a substrate having an electro-optic effect, particularly, any single crystal of LiNbO$_3$, LiTaO$_5$ or PLZT (lead lanthanum zirconate titanate) can be properly used. Particularly, LiNbO$_3$ and LiTaO$_5$, which are often used in optical modulators, are preferably used. In addition, the optical waveguide formed in the substrate is formed by thermally diffusing, for example, high-refractive-index materials such as titanium (Ti) on a LiNbO$_3$ substrate (LN substrate). In addition, the optical waveguide can also be formed as a ridge optical waveguide by forming a groove in the lateral face of the optical waveguide or forming the optical waveguide portion thicker than the other substrate portion.

The control electrode includes the signal electrode and the ground electrodes, forms a Ti/Au electrode pattern on the surface of the substrate and can be formed by a gold plating method or the like. Further, a buffer layer such as a dielectric of SiO$_2$ can be also provided, as necessary, on the surface of the substrate after the formation of the optical waveguide.

The "connection substrate" in the invention means a relay substrate that connects an input terminal to which an electrical signal is input from the outside and a signal input section of the optical waveguide device, a terminator that absorbs the electrical signal by a resistor or the like, connected to the output end of the signal electrode of the optical waveguide device, in order to suppress reflection of the electrical signal, or a termination substrate that connects the output end of the signal electrode of the optical waveguide device and an output terminal thereof, and the like. As a substrate material of the connection substrate, a material having a lower dielectric constant than that of the substrate material of the optical waveguide device, for example, alumina or a semiconductor material is used. This is to contribute to the wider bandwidth of the optical waveguide device.

As an interconnection that connects the optical waveguide device and the connection substrate, a gold wire or a wide-width gold ribbon can be used. In particular, a method of performing wire bonding of a gold wire is preferable as a method of wiring the two. In addition, the interconnection is not limited to one, and the vicinity of the same place may be connected by a plurality of gold wires.

As shown in FIG. 3, the distance W1 between the ground electrodes of the optical waveguide device and the distance W2 between the ground lines of the connection substrate are different from each other. In particular, when the distance W1 is larger than the distance W2, the distance W between interconnections 3 that electrically connect the connection substrate and the optical waveguide device is made smaller than the distance W1. Thereby, the difference between the electric field intensity between the signal electrode and the ground electrode of the optical waveguide device and the electric field intensity between the signal line and the ground line of the connection substrate becomes small and thus the optical frequency response is improved.

In addition, the connection positions of the ground interconnections 3 at the ends of the optical waveguide device side can also be connected to the portions smaller than the distance W2. In such a case, since a change in the electric field intensity from the connection substrate side to the optical waveguide device side can be made more continuously, deterioration of the electrical characteristics can be further suppressed.

Figure 1:
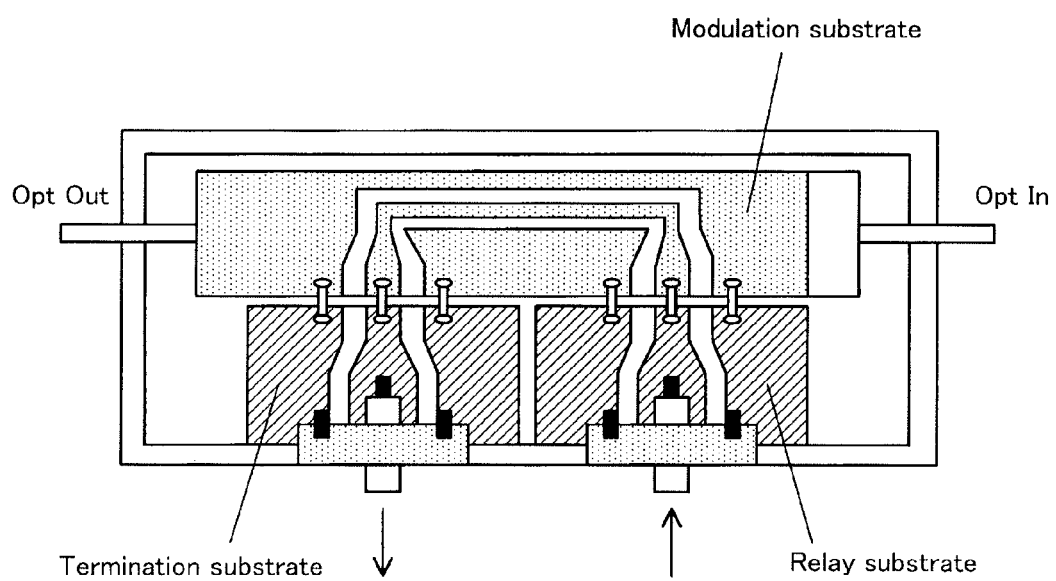
FIG. 1 is a diagram for explaining a conventional optical waveguide device module.
Figure 2A:
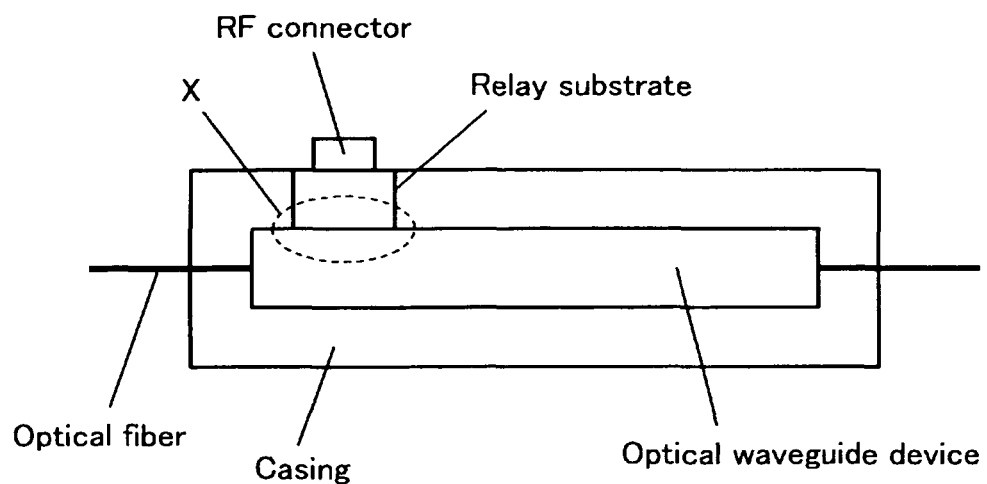
FIGS. 2A and 2B are diagrams for explaining an electrode structure and the like when a material having a lower dielectric constant than that of a substrate of an optical waveguide device is used in a relay substrate.
Figure 2B:
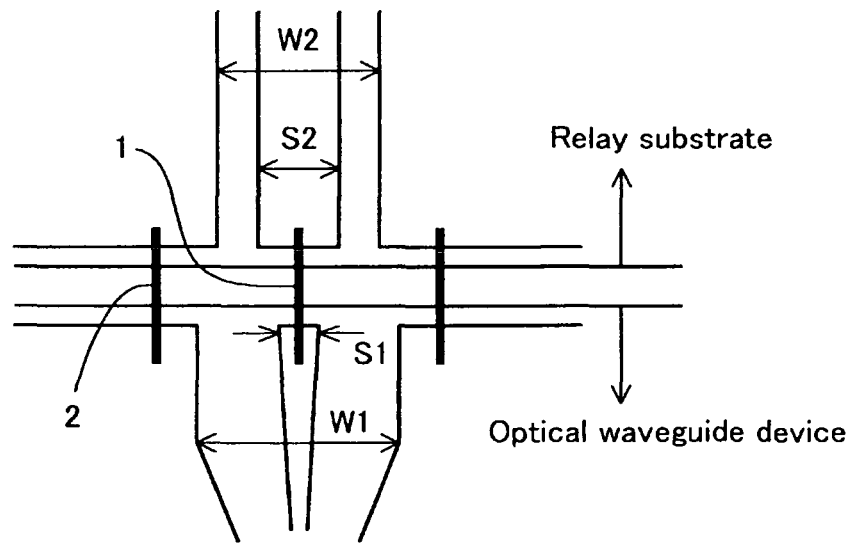

As shown in FIG. 3, it is also possible to provide other interconnections 2, having an interconnection distance larger than the distance W1, which are disposed so as to sandwich ground interconnections that connect the optical waveguide device and the connection substrate. Such interconnections 2 are the same as conventional interconnections 2 as shown in FIGS. 2A and 2B. It is possible to more reliably perform electrical connection of the ground portions by connecting the ground electrodes by the interconnections 2 and 3.

In FIG. 3, since the width of the signal electrode in the input end or the output end of the control electrode and the width of the signal line of the optical waveguide device side are different from each other in size, electrical discontinuity due to the connections usually occurs. However, as in the invention, the distance W between the ground interconnections that connect the optical waveguide device and the connection substrate is set to be smaller than the distance W1, whereby it is possible to suppress discontinuity of the electrical strength, and to prevent the electrical characteristics from being deteriorated.

The width of the signal line of the connection substrate is in a range of 0.1 mm to 1 mm, more preferably 0.2 mm to 0.5 mm. In addition, the thickness of the connection substrate is in a range of 0.1 mm to 1 mm, more preferably 0.2 mm to 0.5 mm.

The width between the ends of the signal electrode included in the optical waveguide device is in a range of 0.03 mm to 0.5 mm, more preferably 0.05 mm to 0.25 mm.

Figure 5:
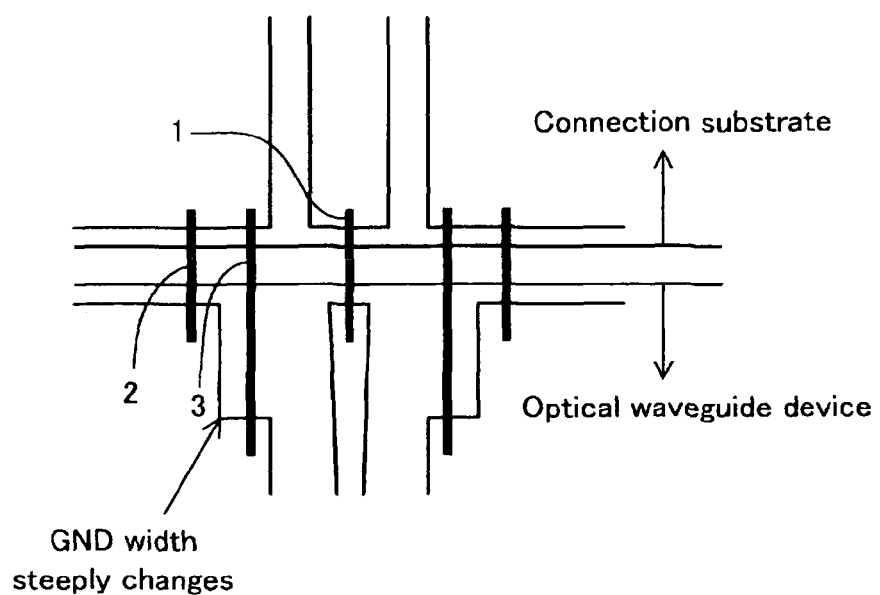
FIG. 5 is a diagram illustrating an interconnection example when the distance between ground electrodes of the optical waveguide device in the optical waveguide device module according to the invention is rapidly changed.

As shown in FIG. 5, even when the width between the ground electrodes rapidly changes, it is possible to lessen rapid changes in the electric field intensity by providing the interconnection 3 as in the invention.

Figure 6:
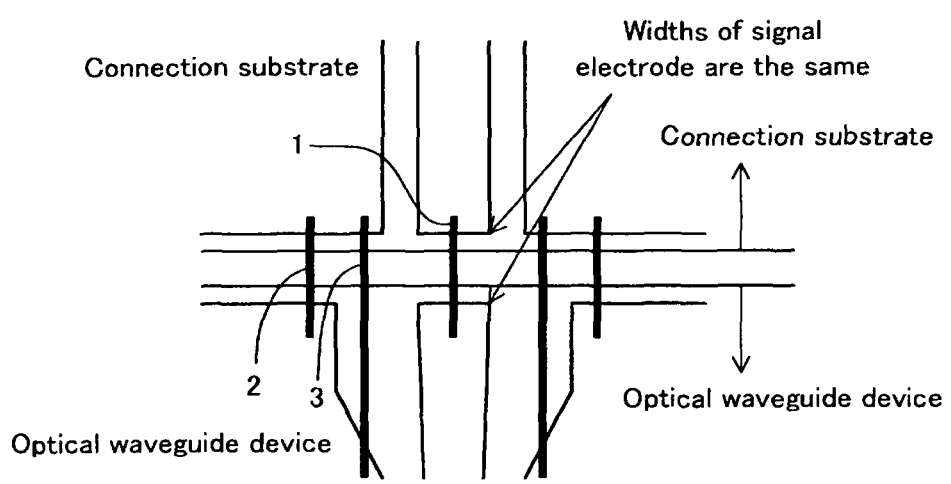
FIG. 6 is a diagram illustrating an interconnection example when the width of a signal electrode of the optical waveguide device and the width of a signal line of the connection substrate in the optical waveguide device module according to the invention are equal to each other.

In addition, as shown in FIG. 6, the width of the signal line of the connection substrate and the width of the signal electrode of the optical waveguide device are configured to be the same, and connection is performed using a plurality of gold wires or a wide-width gold ribbon, whereby it is possible to improve the high frequency characteristic. In such a case, since there is an increasing possibility, from the relation to impedance matching, that the distance between the ground lines and the distance between the ground electrodes will be different from each other, the method of connecting the interconnections as in the invention can be applied more effectively.

Figure 4:
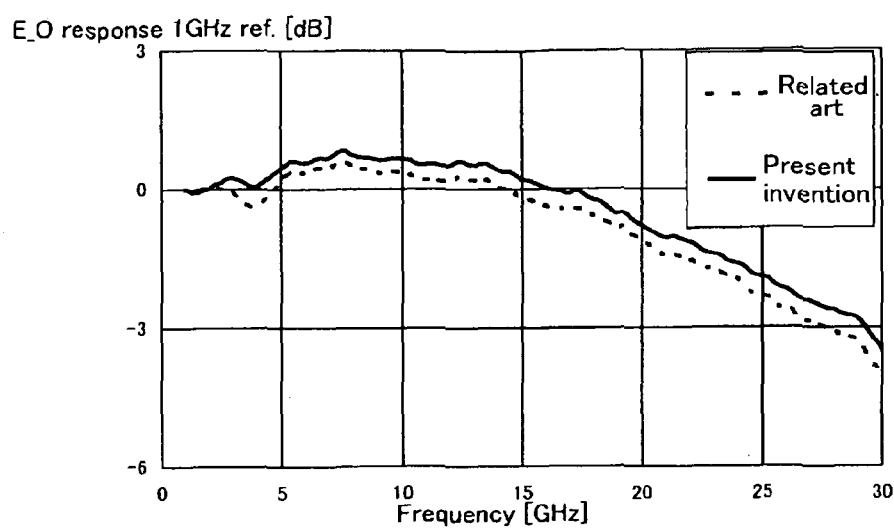
FIG. 4 is a graph illustrating a comparison result of an optical frequency response between the invention and the prior art.

FIG. 4 shows a result obtained by comparing the optical frequency response of the optical waveguide device module according to the invention shown in FIG. 3 with the optical frequency response in the prior art shown in FIGS. 2A and 2B. From the graph of FIG. 4, it can be easily understood that the characteristics of the optical waveguide device module according to the invention are improved over the entire frequency band.

As described above, according to the invention, it is possible to provide an optical waveguide device module in which discontinuity in the electrical connection of the optical waveguide device and the connection substrate is reduced and deterioration of the electrical characteristics is prevented. Furthermore, it is also possible to provide an optical waveguide device module capable of using a common connection substrate with respect to different types of optical waveguide device and lowering the manufacturing costs.

What is claimed is:

1. An optical waveguide device module comprising:
    an optical waveguide device including a substrate having an electro-optic effect, an optical waveguide formed in the substrate, and a control electrode for controlling light waves propagated through the optical waveguide;
    a connection substrate including an interconnection, provided to the outside of the optical waveguide device, which is electrically connected to the control electrode; and a casing that accommodates the optical waveguide device and the connection substrate therein, wherein the control electrode includes a signal electrode and ground electrodes disposed so as to sandwich the signal electrode, the connection substrate is provided with a signal line and ground lines disposed so as to sandwich the signal line, a distance W1 between inner edges of the ground electrodes closest to the signal electrode, measured at an input end or output end of the control electrode, is larger than a distance W2 between inner edges of the ground lines closest to the signal line on the optical waveguide device side of the connection substrate, the control electrode has a portion in which the distance between the ground electrodes is smaller than the distance W2 in a portion away from the input end or the output end thereof, and the optical waveguide device module includes ground interconnections that connect the optical waveguide device and the ground lines of the connection substrate, wherein a distance W between the ground interconnections measured at the point where the ground interconnections connect with the ground lines is smaller than the distance W1.

2. The optical waveguide device module according to claim 1, wherein the optical waveguide device module includes other interconnections, which are disposed so as to sandwich the ground interconnections that connect the optical waveguide device and the connection substrate, and of which the interconnection distance is larger than the distance W1.

3. The optical waveguide device module according to claim 1, wherein the width of the signal electrode in the input end or the output end and the width of the signal line on the optical waveguide device side are different from each other in size.

4. The optical waveguide device module according to claim 1, wherein the dielectric constant of the connection substrate is lower than the dielectric constant of the substrate included in the optical waveguide device.

5. The optical waveguide device module according to claim 1, wherein the interconnection that connects the optical waveguide device and the connection substrate is formed by wire bonding.

6. The optical waveguide device module according to claim 2, wherein the width of the signal electrode in the input end or the output end and the width of the signal line on the optical waveguide device side are different from each other in size.

7. The optical waveguide device module according to claim 2, wherein the dielectric constant of the connection substrate is lower than the dielectric constant of the substrate included in the optical waveguide device.

8. The optical waveguide device module according to claim 3, wherein the dielectric constant of the connection substrate is lower than the dielectric constant of the substrate included in the optical waveguide device.

9. The optical waveguide device module according to claim 2, wherein the interconnection that connects the optical waveguide device and the connection substrate is formed by wire bonding.

10. The optical waveguide device module according to claim 3, wherein the interconnection that connects the optical waveguide device and the connection substrate is formed by wire bonding.

11. The optical waveguide device module according to claim 4, wherein the interconnection that connects the optical waveguide device and the connection substrate is formed by wire bonding.

* * * * *